(12) United States Patent
Jacobs et al.

(10) Patent No.: US 8,915,517 B1
(45) Date of Patent: Dec. 23, 2014

(54) STORAGE PLATFORM FOR KNEE SCOOTERS (KNEE WALKERS)

(71) Applicants: Mark C. Jacobs, Folsom, CA (US); Gino Romeo Tofanelli, Sacramento, CA (US)

(72) Inventors: Mark C. Jacobs, Folsom, CA (US); Gino Romeo Tofanelli, Sacramento, CA (US)

(73) Assignee: Mark C. Jacobs, Folsom, CA (US)

( * ) Notice: Subject to any disclaimer, the term of this patent is extended or adjusted under 35 U.S.C. 154(b) by 0 days.

(21) Appl. No.: 13/987,841

(22) Filed: Sep. 9, 2013

(51) Int. Cl.
*A61H 3/04* (2006.01)
*B60N 3/00* (2006.01)

(52) U.S. Cl.
CPC ...................................... B60N 3/002 (2013.01)
USPC ...................... 280/727; 280/87.021; 280/87.1; 280/87.041; 297/153; 297/188.12; 108/27; 108/28

(58) Field of Classification Search
CPC ... A61H 3/04; A61H 2003/005; A47B 23/02; A47B 23/025; A47B 13/16; A47B 13/08
USPC ........... 280/727, 87.021, 87.03, 87.1, 87.041; 108/27, 28; 297/153, 188.12; 248/311.2; 206/146
See application file for complete search history.

(56) References Cited

U.S. PATENT DOCUMENTS

| | | | | |
|---|---|---|---|---|
| 2,750,206 A * | 6/1956 | Sabato | ........................... | 280/204 |
| 2,963,256 A * | 12/1960 | Borah | ...................... | 248/346.04 |
| 3,891,132 A * | 6/1975 | Chandler | ....................... | 224/509 |
| 4,659,099 A * | 4/1987 | Malone | ........................ | 280/304.1 |
| 4,946,058 A * | 8/1990 | Stamm | ......................... | 220/23.83 |
| 4,972,781 A * | 11/1990 | Montgomery et al. | ......... | 108/25 |
| 5,176,259 A * | 1/1993 | Andersen | ....................... | 206/557 |
| 5,219,435 A * | 6/1993 | Sprunger | ...................... | 280/511 |
| 5,382,074 A * | 1/1995 | Pietra | ............................. | 297/153 |
| 5,437,493 A * | 8/1995 | Weisleder | ....................... | 297/150 |
| 5,535,682 A * | 7/1996 | Aigeldinger | .................... | 108/25 |
| 6,089,519 A * | 7/2000 | Laybourne | ............... | 248/346.11 |
| 7,131,170 B2 * | 11/2006 | Weaver | ............................ | 24/545 |
| 7,287,767 B1 * | 10/2007 | Gomes et al. | ............. | 280/87.021 |
| 7,494,139 B2 * | 2/2009 | Turner et al. | .............. | 280/87.021 |
| 7,523,900 B1 * | 4/2009 | Hlatky | ............................ | 248/201 |
| 7,731,144 B2 * | 6/2010 | Kazyaka | ..................... | 248/311.2 |
| 7,861,991 B1 * | 1/2011 | Sylvertooth-Jackson | . | 248/274.1 |
| 7,980,572 B2 * | 7/2011 | Bennett | ..................... | 280/87.021 |
| 2004/0226486 A1 * | 11/2004 | Simpson | .......................... | 108/47 |
| 2011/0298190 A1 * | 12/2011 | Diaz | .......................... | 280/87.021 |
| 2012/0060877 A1 * | 3/2012 | Kirby | ............................... | 135/66 |

* cited by examiner

*Primary Examiner* — Paul N. Dickson
*Assistant Examiner* — Darlene P Condra
(74) *Attorney, Agent, or Firm* — Mark C. Jacobs

(57) ABSTRACT

An apparatus that mounts in a horizontal disposition on the frame member(s) of a knee scooter for the transportation of goods between locations. The apparatus is a generally rectangular main body member having recesses in the top surface thereof of various shapes for the lodging of articles in the recesses for the retention thereof during the operation of the knee scooter. Straps are provided for the retention of articles that are not disposed in the recesses, but instead will rest on the top surface of the apparatus, such as books or a newspaper for carrying same from place #1 to place #2. The apparatus is removably mounted to the frame member(s) of the scooter by medium size spring type grip clips or a clamp formed form a bar held by machine screws. Anti-torque attachments mountable facing forward are also shown.

15 Claims, 8 Drawing Sheets

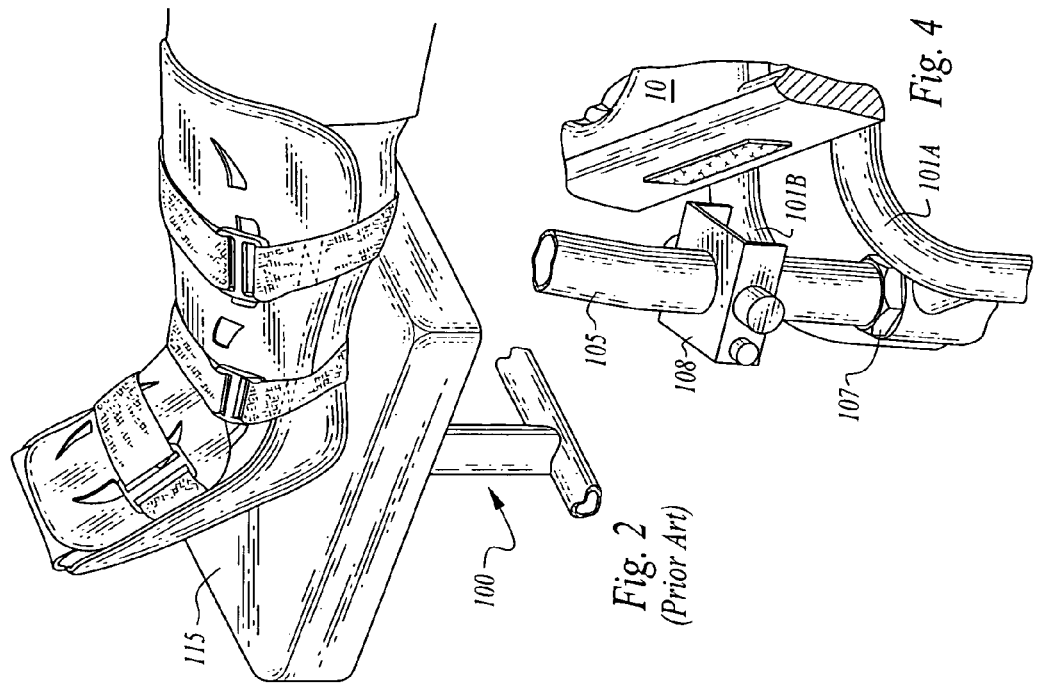
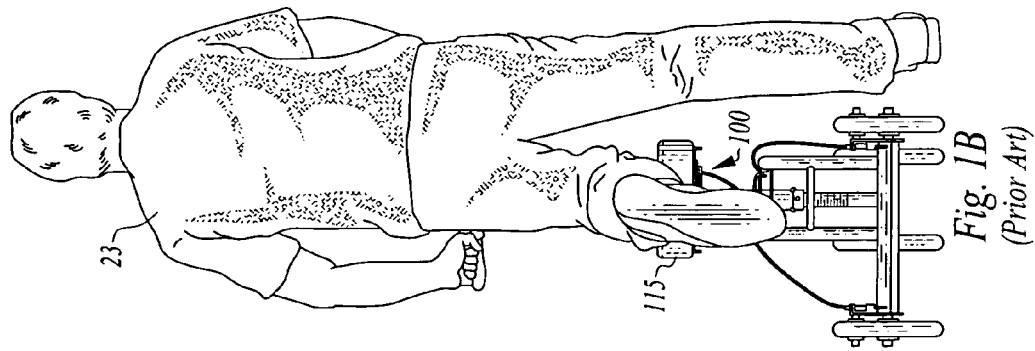
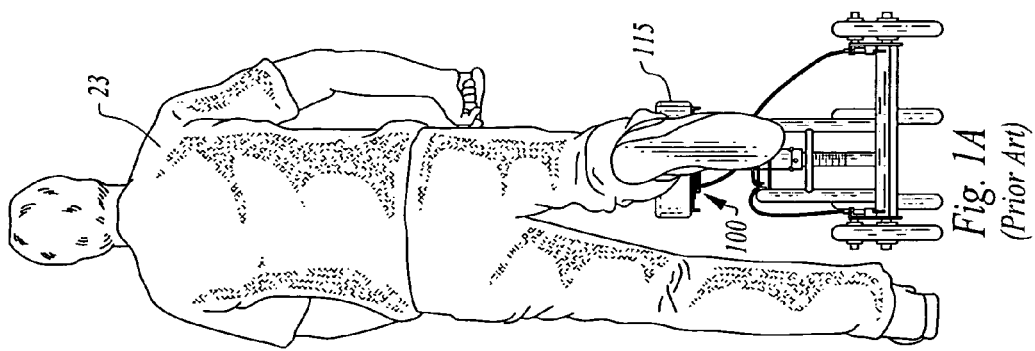

STORAGE PLATFORM FOR KNEE SCOOTERS (KNEE WALKERS)

FIELD OF INVENTION

This patent application relates to an apparatus, which is removably mountable on a knee scooter for retaining and transporting articles while a person is utilizing a knee scooter.

BACKGROUND OF THE INVENTION

Knee scooters also known as knee walkers are a relatively new invention. These are wheeled devices that provide a means of mobility to persons with single leg issues, such as broken toes, dislocated ankles, broken bones below the knee, etc. The user bends the injured leg at the knee and then rests the area between the knee and the ankle of the bad leg on the knee support, which is generally a rectangular shaped pillow attached to a height adjusting rod, which in turn is attached to the superstructure of the knee walker.

The apparatus of this invention came about because one of the applicants had a fractured right ankle and did not want to use crutches to get around. He knows of the existence of a knee walker from others who had had ankle and toe problems. The mobility apparatus used by the applicant is the subject matter of U.S. Pat. No. 7,780,180 issued to John Hoepner et al and marketed by Essential Medical Supply, Inc. of Orlando Fla. Yet another patented knee walker is that of Gomes et al found in U.S. Pat. No. 7,287,767. Yet another style of knee walker is the unit designated as the Weill knee walker invented by Dr. Lowell Weill of the Chicago area. This unit has an available basket that mounts on the up tube of the walker, which offers limited carrying capability.

The Hoepner apparatus as marketed is just fine for mobility. That is, it works as needed for moving from point A to point B. Or from getting out of a vehicle to the time of seating at a restaurant. Other knee scooters such as the one forming the subject matter of U.S. Pat. No. 7,938,413 issued to Michael Anderson issued on May 10, 2011 and U.S. Pat. No. 8,348,288 issued Jan. 8, 2013 to Thomas Laughon, suffer from the same limitation in that the carrying of articles thereon is next to impossible.

The distributors of the Hoepner apparatus supply a small vinyl bag that attaches to the handlebar and hangs vertically in front of the main vertical tube. It is suitable for carrying fruit or other small items for lunch or small items from a grocer. Applicant Jacobs did not have such a bag, as the medical supply company that rented the unit did not provide one. Applicant Jacobs discovered that there was a need for a way to transport kitchen items, such as silverware and plates, and milk cartons, and other items from the refrigerator to the table while still being able to drive and steer around such items as a kitchen island, and chairs either occupied or not occupied by other persons. Baskets and bags that were accessories sold for knee scooters were not a satisfactory answer.

Not only was there a need for carrying kitchen items, but it was quickly discovered that it would be beneficial to be able to transport other items such as a pen, a book, a cell phone or land line house phone. It was later discovered that students with football or soccer injuries needed a means of carrying their books as they went from classroom to classroom in a high school or college environment. Once these needs were understood, the applicants decided to create an apparatus to fill these needs. That is they set out to create an apparatus for carrying various items from one location to another on a knee scooter.

It is to be seen that the terms knee walker and knee scooter are used interchangeably.

SUMMARY OF THE INVENTION

This invention as noted relates to an apparatus that mounts in a horizontal disposition on the frame member(s) of a knee scooter for the transportation of various goods from one location to another. The apparatus is a generally rectangular member having recesses therein of various shapes for the lodging of articles in the recesses for retention of the articles during the operation of the knee scooter. Straps are provided for the retention of articles that will rest on the top surface of the apparatus, such as books or a newspaper for carrying same from place #1 to place #2. The apparatus is removably mounted to the frame member(s) of the scooter by medium size grip clips made by Lehigh Consumer Products LLC and sold under the Crawford brand. Other sources of such spring type clips are also available in the marketplace.

BRIEF DESCRIPTION OF THE FIGURES

FIG. 1A and FIG. 1B are rear elevational views of a user operating a prior art knee scooter, where in the right foot is the injured foot in FIG. 1A and the left foot is the injured foot in FIG. 1B.

FIG. 2 is a closeup view of an injured foot with a "walking boot" thereon resting on the seat portion of a prior art knee walker. The boot is not related to the invention of this application.

FIG. 4 is a closeup view of a portion of the steering mechanism of a prior art knee walker.

DESCRIPTION OF THE PREFERRED EMBODIMENT

FIG. 1, has a part A wherein the rider is shown using the prior art knee scooter of U.S. Pat. No. 8,348,788, wherein the right leg is the injured leg and as such is shown disposed on the kneepad 115 of the scooter 100. In FIG. 1B, it is just the opposite, the injured leg is the left leg and it shown disposed on the kneepad 115 of knee scooter 100.

Figure 3:
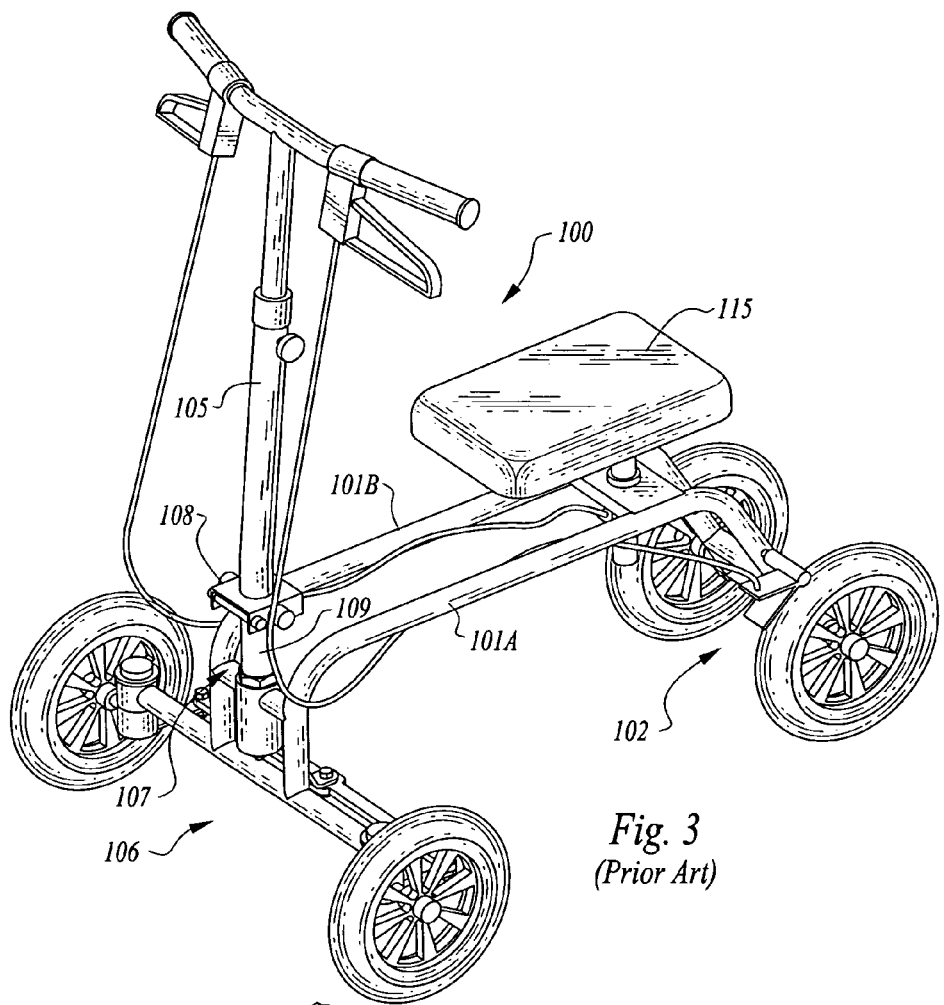
FIG. 3 is a perspective view of the Hoepner et al prior art knee scooter.
Figure 5:
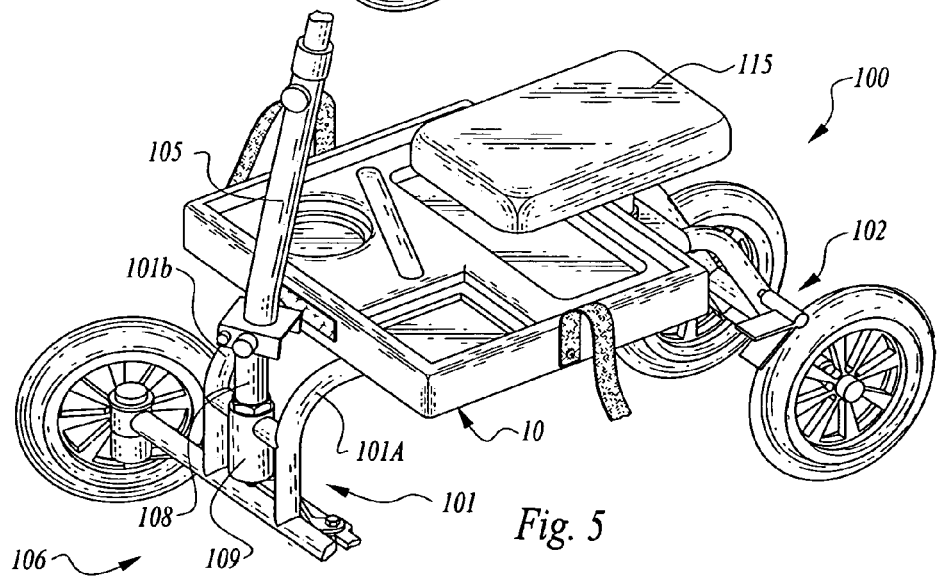
FIG. 5 is a closeup view of the Hoepner et al knee scooter with the invention of this application mounted thereon.

FIG. 2 is a view unrelated to the invention, showing an injured foot in what is called a protective walking boot—also a prior art item—resting on the kneepad 115 of a prior art scooter 100. The purpose of this view is to illustrate the appliance worn by one of the applicants of this application that necessitated the use of the prior art knee scooter that led to the invention of this patent application due to limited mobility FIG. 3 is a perspective view of a typical prior art knee scooter, namely the one of U.S. Pat. No. 7,780,180. The text of that US issued patent is incorporated herein by reference. Thus only a brief discussion will be set out of the construction of such a knee walker. The apparatus is seen to have spaced front wheels on an axle, forming a front wheel assembly 106, attached to a steering mechanism 107 in FIG. 4 that allows the front wheels to turn left and right like those of an automobile. The rear wheels are on a fixed axle (rear wheel assembly 102) and move only in a straight line. Steering is manually controlled from the handle bar and the steering mount 108, whose movement directionally is mimicked by the front wheels. A vertical height adjustable shaft 105 seen also in FIG. 5 is disposed between the frame members 101 and is connected to the handle bars and other elements for steering the scooter. The frame comprises a pair of inverted U-shaped parallel tubular members, 101A and 101B which are disposed on one end to a front frame cross member that extends laterally outwardly from the frame and on the other end to a rear frame member and wheel assembly 102 that also extends laterally outwardly therefrom. A knee cushion 115, is adjustably upwardly supported on the upper side of said frame. Reference is also made to FIG. 4 a closeup view which also shows some of these elements as ell as FIG. 5. Elements 108 and 109 will be discussed infra.

For the invention at hand the reader only needs to be concerned about the frame, the knee cushion and vertical tube 105. In FIG. 5, the relative positioning of the apparatus of this invention is seen when mounted for use on the scooter 100, relative to the knee pillow 115. Other elements of the scooter have been discussed supra.

Figure 6:
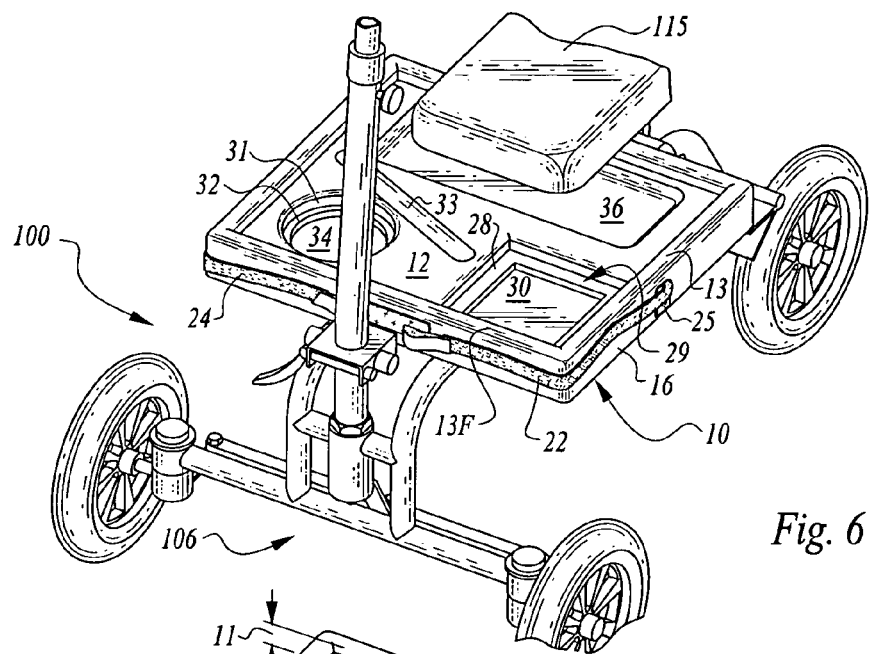
FIG. 6 is a front perspective view of the first embodiment of this invention mounted on a knee scooter.

In FIG. 6 we see the first embodiment of this invention. The apparatus 10, is generally rectangular in cross section, and is about 13 inches wide and about 11 inches long from front to rear. Length is intended to mean the dimension of the inventive unit between the front and back wheels of the scooter, while width is the transverse dimension across the frame of the scooter. The height of the unit is preferably about 1.75 inches, measured at the circumferential raised rim 13 which is raised up about 0.5 inches above the top surface 12. Thus general elevation of the main body 15, is about one inch from bottom to top surface.

Apparatus 10 is seen to have a series of defined recesses on its upper surface and a raised rim 13 along the entire periphery of the storage platform of this invention. The left front corner has a first recess 29, formed in the shape of a chamfered square, about 4.25×4.25 inches in cross section of 4 normally disposed strips of wood, 28 or molded as a unitary member 0.625 inches wide and about 0.5 inch down from the top surface 12 of the apparatus. This first recess 29 is sized to hold a ½ gallon carton of milk or juice within the recess on the surface of the strips.

A second concentric square recess 30 is sized about 3.0 inches×3.0 inches and is disposed at a lower second level from the top surface 12. Square 30 is formed from the vertical edges of the strips 28 or molding and is intended due to its size, either a one quart cardboard container or a ½ pint cream size container. Since there are small vertical surfaces between the different recess depths, the properly sized containers will stay within the confines of their recess for transportation from refrigerator to table and back.

On the right side of the first embodiment there are two concentric circular recesses. Circular recess 31 is formed of an approximately 0.375" circular strip about 0.25 inch deep, and is about 3.50 inches in cross section and designated 32; while the lower surface concentric circle therein is about 2.625 inches in diameter. These are sized to receive common household jars and cups and coffee mugs. It is within the scope of this invention to have a third concentric circle of an even smaller diameter, at a third level down from top surface 12, such as to hold an espresso cup or a jar from such products as instant coffee. Likewise a third concentric square recess of even smaller diameter is also envisioned at a third level down.

A preferably diagonally disposed trough 33, about 0.75 inches to 1.0 inches in the small dimension and about 7 inches long by about 0.25 to 0.75 inches deep is intended to hold a pen or pencil or a single piece of flatware such as a butter knife or steak knife. If made smaller than 7 inches in length, the trough 33 could also be disposed parallel to the front wall 13F of the rim 13.

Rear recess 36 is disposed downwardly to the second level and may have chamfered corners for its rectangular shape. This recess is about ⅜ ths inch deep and measures between 8 inches and 10 inches in width parallel to front wall 13F, and about 3.0 to 3.5 inches in length. This large well 36 is intended for reception of a land line or cell phone, or several items of flat ware, or even the base of a small plate such as a saucer. It is within the skill of the art to determine what other items one might want to carry in this large well 36/

As mentioned earlier the rim 13 is raised up above the top level 12. This is done to permit large items, both flat and non flat, to lie on the top surface 12 and be transported without fear of falling off. The raised edge of 13 acts like a guard to retain items on the surface 12.

Figure 8:
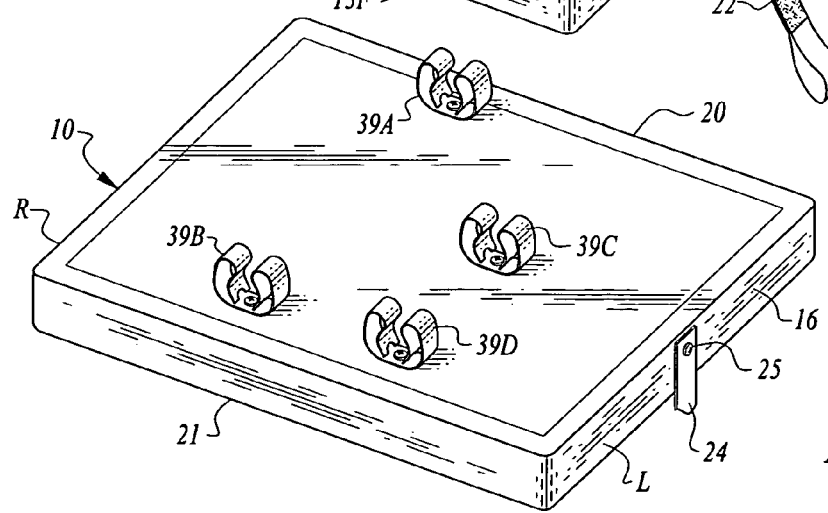
FIG. 8 is a bottom perspective view of the first and second embodiments of this invention.

Mounted on the left side wall 16 and on the right side wall—but not visible in FIG. 6 are a pair of hook and loop closure straps, 22 and 24. These are each retained on one end, at about the midpoint of the sidewall 16 by a one or more screws 25, as is seen in FIG. 8. The other end of each strap is matingly engaged to a tab 26 of the opposite gender self adhesive hook and loop material, of which Velcro® is the most well known brand, attached to the front wall 20. Usually the tab is the hook portion and the loop portion of the strap is the end having the loop connections capability.

Figure 7:
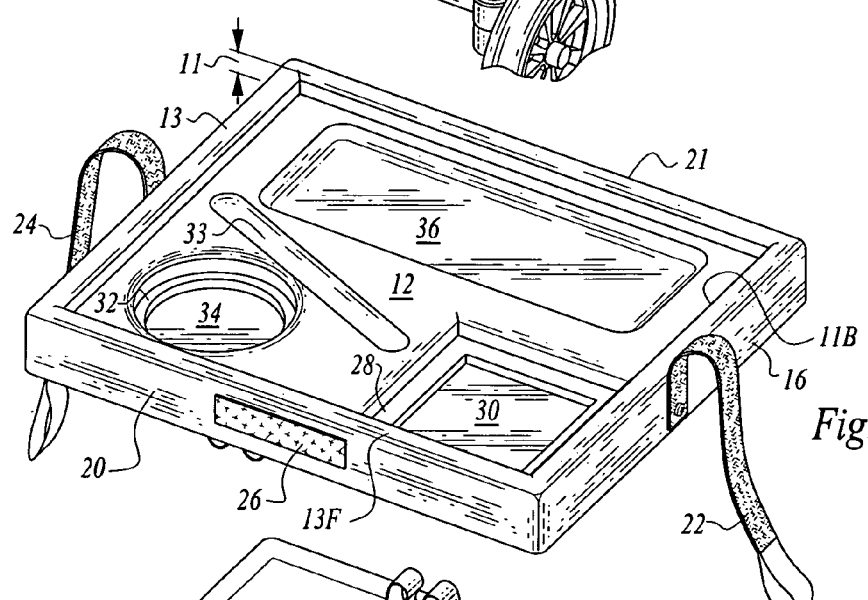
FIG. 7 is a top perspective view of the first embodiment hereof.

Note how the platform 10 of this invention is disposed beneath and forwardly of the pillow 115 such that all items placed on the storage platform 10 can be easily accessed. In FIG. 7, a top slightly perspective view thereof, the depth 11 which is the difference in elevation between the top of the rim 13 and the upper or top surface 12 can be readily seen.

FIG. 8 is a bottom perspective view wherein strap 22 the left strap is seen on the right side of the figure. A series of 4 medium size grip clips 39A, 39B, 39 C, and 39 D marketed under the Crawford brand by Lehigh Consumer Products LLC of Macungie, Penna and available at Ace and other hardware stores, are seen to be attached to the underside of the apparatus 10. Note that the R and L are for the convenience of the reader and set out the side of the unit when viewed from the top. The four clips are mounted such that 39C the left side forward clip is disposed rearwardly of right front clip 39A, while the two rear clips 39B and 39D are in alignment parallel to the rear wall 21 of the apparatus. The reason for the disposition configuration is that by placing 39C rearwardly, yet aligned with 39D to ensure mountability to left tube 101, the screw used to hold 39C is able to be driven into an area where there are no troughs or recesses, thus ensuring a good grasping hold for the mounting screw. Clips 39A and 39B are in a line and evenly spaced apart laterally from 39C and 39 D to ensure that all 4 clips will fit onto the two parallel tubes 101A—right and 101B—left of the frame of the scooter. While 4 clips is preferred, 2 clips, one per tube will work also. It is believed that there are other manufacturers of similar clips in the marketplace.

Figure 9:
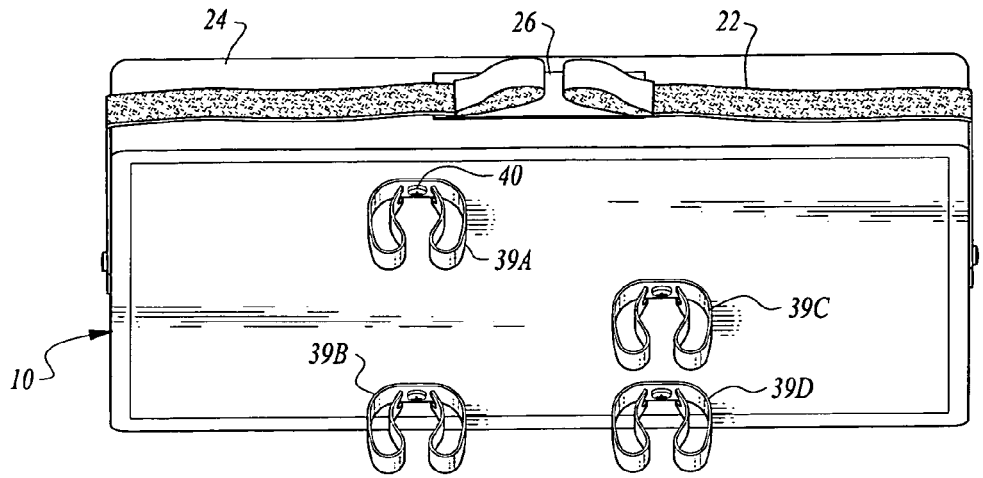
FIG. 9 is a bottom front view of this apparatus, showing the optional external retention straps.

FIG. 9 is a bottom front perspective view of this apparatus. The two straps 24 and 22 are both seen to be removingly attached to front tab 26 on wall 19 B of the rim 13, such as to be out of the way when not in use over the top of the apparatus, thus ensuring that they do not interfere with forward movement of the scooter should they be left dangling down.

Figure 10:
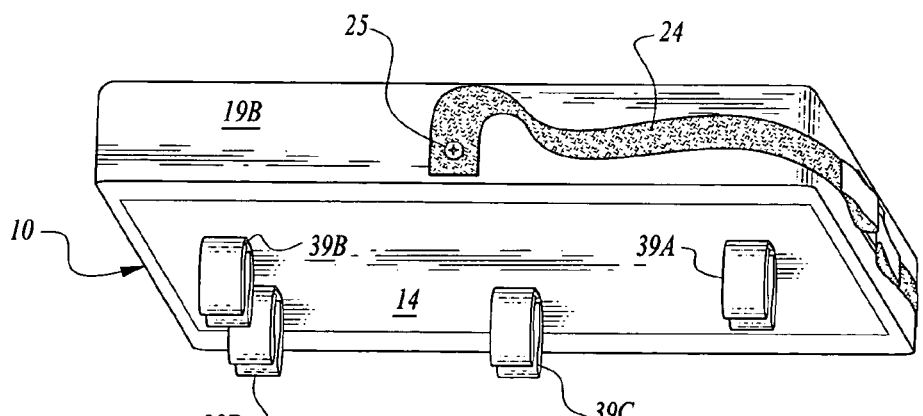
FIG. 10 is a bottom right perspective of the apparatus of this invention with the optional book straps thereon.

FIG. 10 is a bottom right side perspective view showing right strap 24 retained by screw 25 on the side wall 19B of the rim 13. The disposition of the clips has already been discussed. Note however that the positioning of the clips is NOT critical, in that they need not be at any specific location along the mounting line that permits mounting on the two frame tubes of the scooter. The only critical dimension is the lateral spacing to ensure the mating engagement with the frame tubes.

Figure 11:
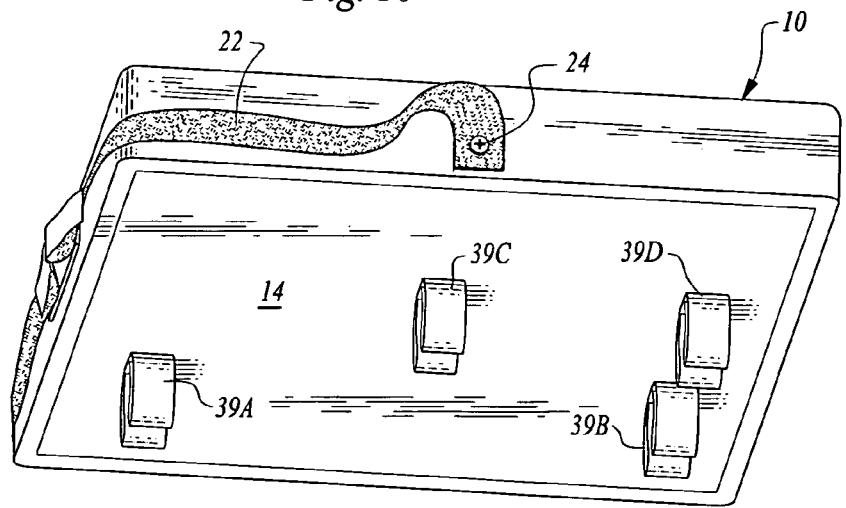
FIG. 11 is a bottom left perspective of the apparatus of this invention with the optional book straps thereon.

FIG. 11 is a view similar to FIG. 10 but taken on the opposite side of the apparatus and as such strap 22 the left strap is seen attached by screw 25. However here, the strap has been moved forwardly to connect to the tab 26 as discussed supra.

Figure 12:
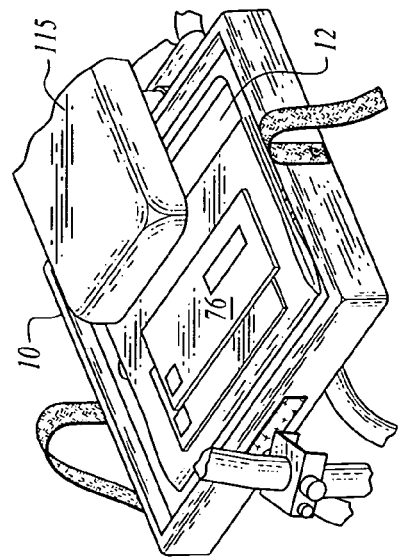
FIG. 12 is a top view showing the first embodiment in mounted position, carrying a calculator and a cordless land line phone.

FIGS. 11-17 inclusive are all present to illustrate how various types of everyday goods may be carried on this apparatus by the scooter user. In FIG. 12, a calculator 70 is seen partially disposed in square recess 30 below the rim 13, while a land line phone is resting neatly within rear trough 36. Whereas in FIG. 13, a % gallon milk jug is seen resting in the larger square recess 28 on strip 29, while the water bottle 73 rests in the smaller circular recess 34 below the strip 32 that defines the upper larger circular recess.

Figure 14:
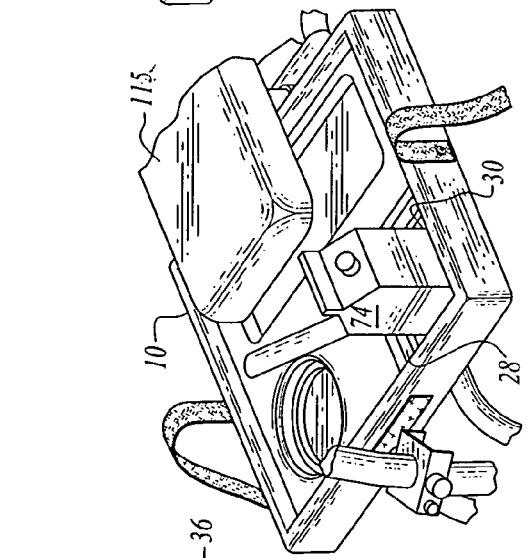
FIG. 14 is a left side perspective view showing the first embodiment in mounted disposition carrying a pen and a land line cordless phone.
Figure 15:
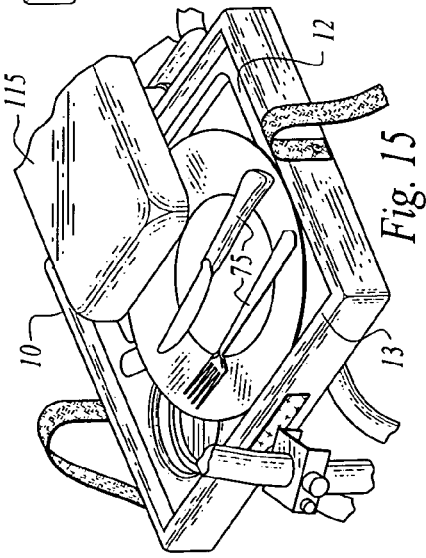
FIG. 15 shows the first embodiment carrying a square bottom milk jug and a round bottom water bottle.
Figure 13:
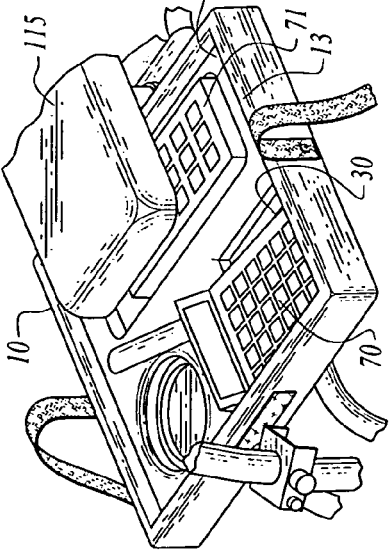
FIG. 13 is top view showing various items of mail laying flat on the apparatus of this invention.

In FIG. 14, a small ½ pint of half and half is seen disposed in the smaller square recess 30 with strip 28 which defines the to recesses acting as a retainer barrier. In FIG. 15 a large (12 inch) dinner plate and accompanying flatware 75 are seen resting on top surface 12 and over the edge of the rim 13. Even so disposed, the plate can be safely transported to the dinner table without fear of spillage, should it be filled with food.

Figure 16:
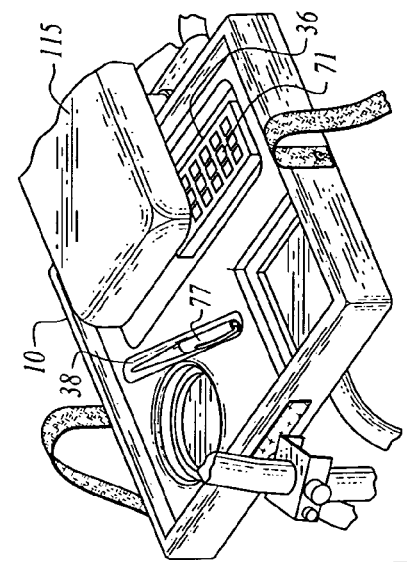
FIG. 16 is a closeup view of the first embodiment carrying a small square bottom milk container.
Figure 17:
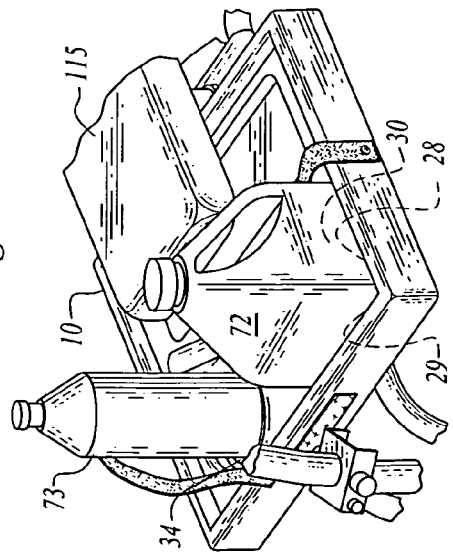
FIG. 17 is a top view of the apparatus of this invention carrying a dinner plate and silverware.

FIG. 16 shows today's assorted mail articles resting on the top surface 12 of the apparatus, while in FIG. 17 a conventional ball pen 77 is resting in the deep angled trough 38. Again the land line phone 71 or equally well a cell phone could be, disposed in the elongated rear trough 36.

Figure 18:
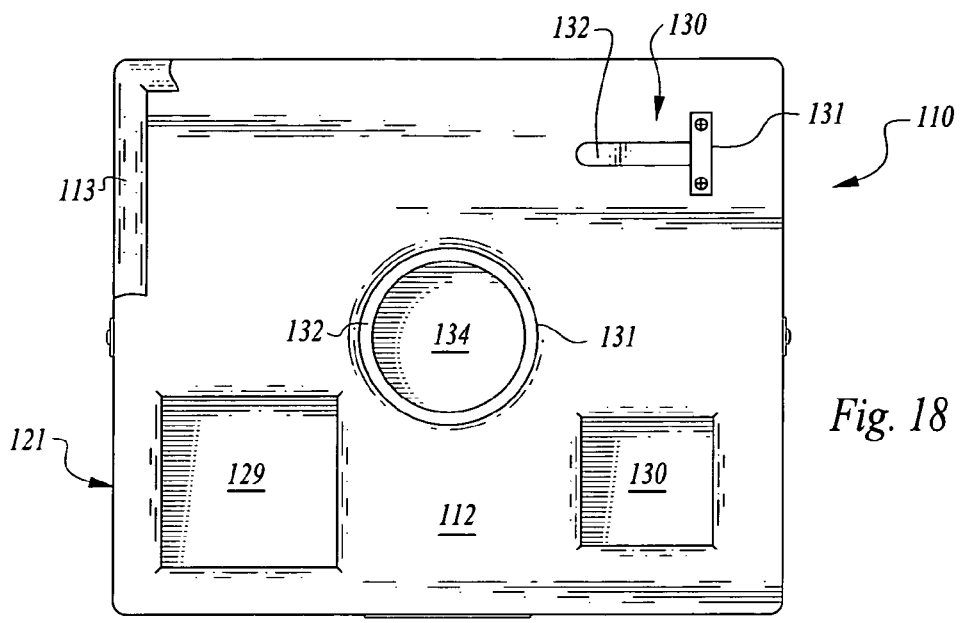
FIG. 18 is a top perspective view of the second embodiment of this invention.

FIG. 18 is a top plan view of a second embodiment of this apparatus 110. This embodiment is laid out differently from the first embodiment. Here at the forward end of the apparatus 121 on the left is a large square recess 129 and to the right thereof in this top plan view a second smaller square recess is seen, 130. Each of these have only a single level recess, and can be used for carrying the same items discussed for the square recesses of the first embodiment. In the center is a dual level round recess of concentric circles duplication the elements 31, 32 and 34 but in the 100 series, wherein similar numbers refer to like parts. These concentric circular recesses can be used to transport, jelly jars, water bottles, among other consumables, and even cups or mugs that fit within either of the two recesses. In the rear right hand corner of the platform 110 is a different retainer means not discussed previously, designated 130. This retainer has a metal or plastic plate 131 disposed over a flexible strap 132. The plate is screwed down or other wise attached to the surface of the top surface 112, and the flexible strap of any length is fixedly disposed under the plate as by screws or glue. The portion of the flexible strap 132 not under the plate has an unseen male portion of a snap connector that can releasably matingly engage a fixed female portion of a snap connector disposed at a location on surface 12 where engagement can transpire. Being flexible, such as of a polymeric material or fabric, strap 132 can retain all types of small items tightly against the surface 12. Among such items are pill bottles, pens, pencils, the handle of a magnifying glass, a glasses case and many other useful objects. Since a rim is optional it is shown only in part on the left front to rear edge of the platform 121. If present the rim would be similar to rim 13 of the first embodiment and would be raised above the top surface 112.

While quite a few modes of attachment of the main body to the tubes of a knee scooter will be shown, other modes of attachment available in the marketplace are contemplated well. Also, since certain brands of prior art scooters only have a single body tube, only 1 set of front and rear mounting means would be required for such scooters. Though front retainers as discussed infra may be employed for added stability to prevent pivoting of the device.

Figure 19:
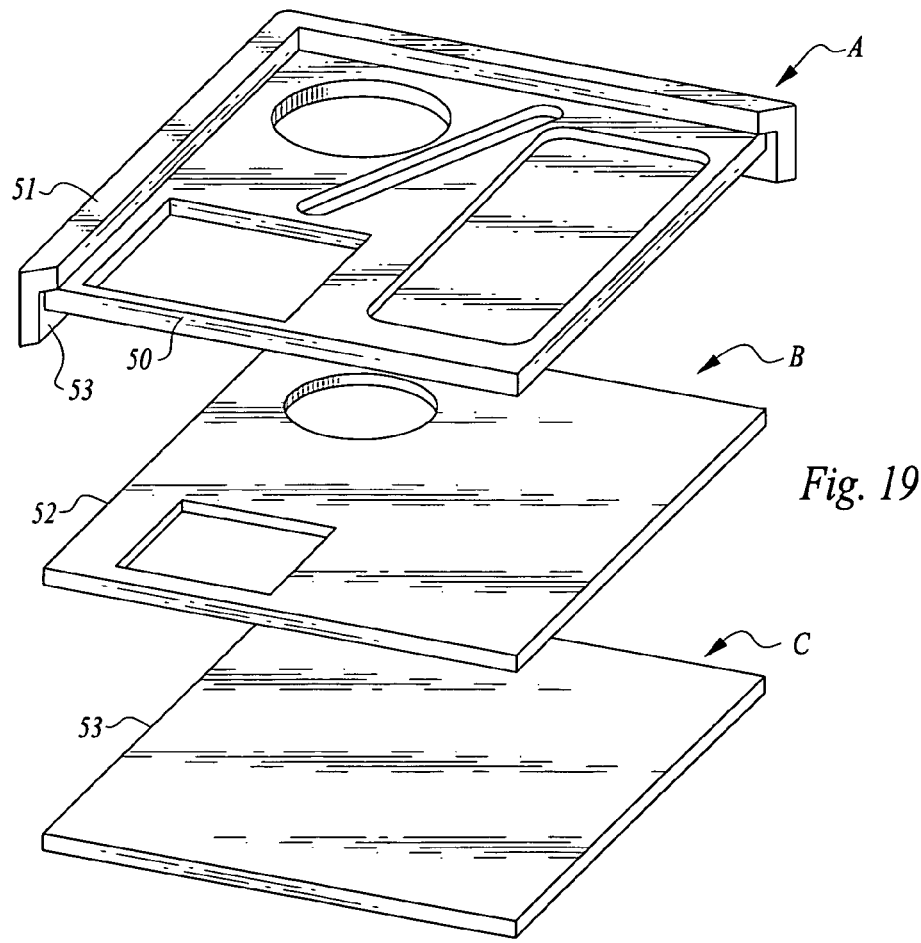
FIG. 19 is an exploded view showing one method of construction of the devices of this invention, though illustrating only the first embodiment

The main body as in the exploded view of FIG. 19 of the apparatus may be made of various layers of wood, glued, screwed or nailed together, which body would be strong and not easily dislodge. In addition, the body could be made by injection molding of various thermo plastics, as well as by roll molding. Reference is made to FIG. 19, which illustrates how 3 separate layers, "A", "B", & "C". of wood or hard plastic can be glued or screwed together to create the first embodiment of the invention. The method is equally applicable to the second embodiment.

In this method, of construction, there are three layers or segments; namely A, B, and C, which are shown apart prior to gluing or screwing of one to the other with B in between A & C. The assembly by screwing is deemed conventional with a set of screws passing from beneath segment C through B and into A, or in reverse, from A, through b into C; or a set of countersunk screws going through from the bottom of B segment into A segment and a second set of screws going from the bottom of B into segment A.

Segment A is comprised of upper platform 50 with its cutouts and trough as described supra, connected to the rim here designated 51. This rim is the same rim as designated 13 in other figures. Platform 50 may be abutted to the surface of rim 50, or a slot, 53, may be routed out such as is shown in rim section 52 in the same FIGURE, into which slot 53, segment 50 may be inset for greater strength. Of course it is to be recognized that for ease and convenience of the reader and illustration, two sections of the rim 51 are not shown attached. Thus the renumbering of the rim.

Segment 52 is seen to be a platform with 3 openings there through, Segment B is sized the same as segment A if segment A is butt fitted, if not it is slightly smaller so as be butt fitted within the confines of the rim 51. Of course the sections of the rim not shown in A can be added after A and B are fastened together. Platform C which is segment 53 can also be sized to fit within the confines of the rim, or the rim can only retain platforms A and B with segment C overlying both platform B and the underside of the rim. Thus there are various permutations of how to assemble the invention of this application, all of which are deemed conventional and within the scope of this invention.

The main body could also be made by molding polyurethane elastomer or some other filled polymer into the desired shape in one piece or the rim could be attached to a sandwich of platforms A, B, and C, as may prove most cost effective in manufacture.

Figure 20:
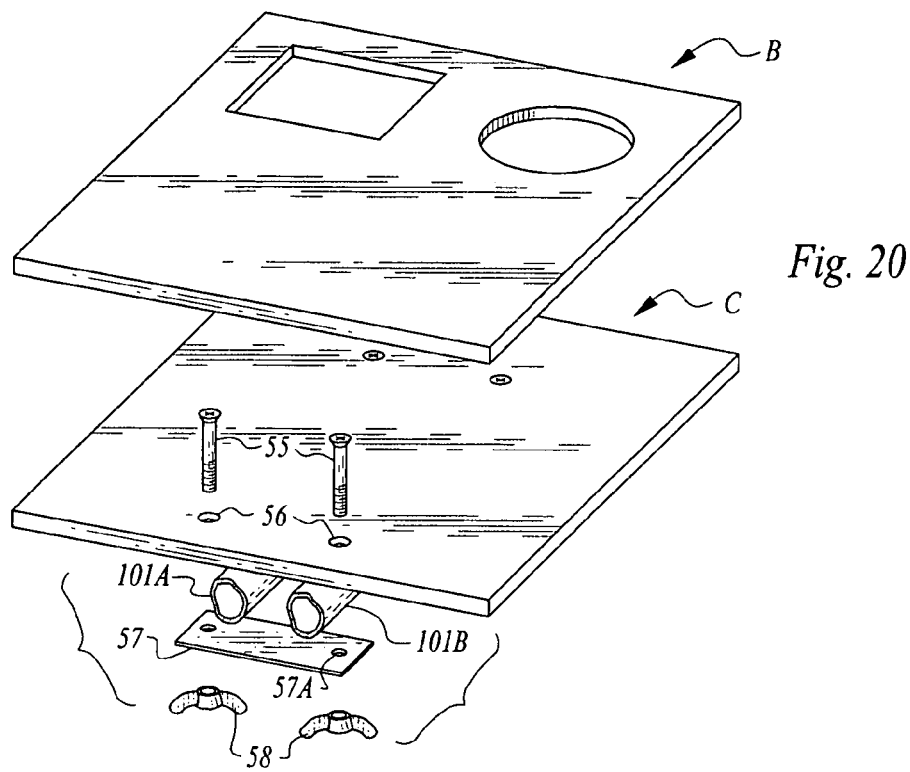
FIG. 20 illustrates an alternative means of mounting the apparatus to the tubes of knee scooter using strap members.

While the spring clips mentioned above are the primary mode of attachment to the tubes of the commercial knee scooter, other modes of attachment are also contemplated. FIG. 20 is an exploded perspective view showing two segments, "B" & "C" of the main body of the apparatus and illustrates the use of boltable plates to act as clamp devices mounted to the under side of the main body 15. In the version of embodiment #1 shown here, the upper layer as seen in FIG. 20, is not shown for ease of understanding. Also only 1 such clamping means 49 is shown.

Clamping means 49 consists of passing through segment "C" a pair of spaced flathead machine screws 55 that are placed through screw apertures 56, prior to attachment of segment B to segment C, which screws 55 when placed through apertures 57a in plate 57 and then tightened rest against the tubes 101A and 101B by wing nuts 58 tightly retain the platform to the two tubes. It should also be noted that it is contemplated that machine screws 55 could be placed through a pre-made sandwich of segments 'A", "B" & 'C' at suitable locations as well. Use of this clamping means 49 instead of the spring clips will provide a more permanent, yet removable, mounting of the apparatus to the two parallel tubes 101 A & B. Indeed, the clamping means shown in FIG. 20, can be used alone singly with one pair of grip clips—not seen in FIG. 20, or two spaced clamping means 49 may be employed or clamping means 49 may be employed a supplement to the two pairs of grip clips 39.

Figure 21:
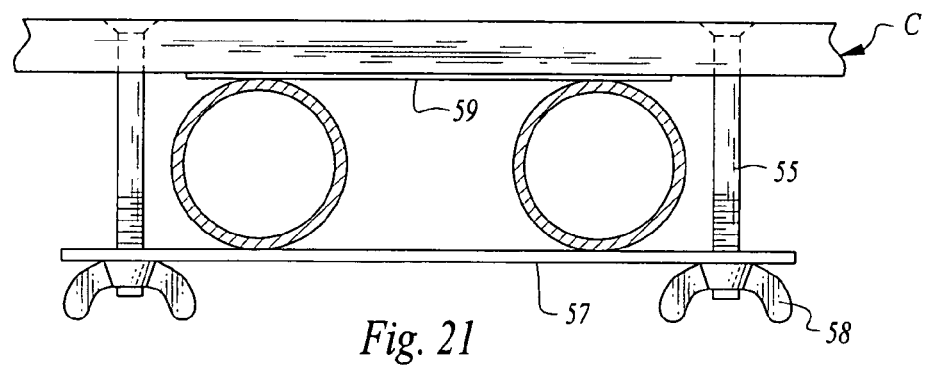
FIG. 21 is an end view depicting a variant of the mounting means for the platform of this invention on a two tube bodied knee scooter.
Figure 22:
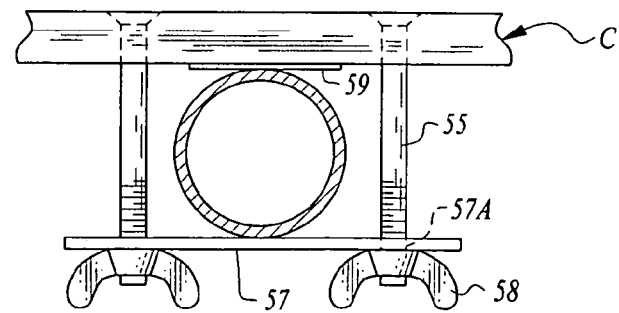
FIG. 22 is an end view depicting a variant of the mounting means for the platform of this invention on a single tube bodied knee scooter.

FIG. 21 is a rear view showing the clamp means 49 mounted to a two tube knee scooter's tubes. Here however, an optional sheet of rubber 59 is shown glued or other wise secured to the underside of segment "C" and interposed against the two tubes. The rubber sheet may be $1/16$ to $1/8$th inch thick and serves to add friction to help prevent movement of the device relative to the tubes. FIG. 22 is related to FIG. 21 but shows a prior art single tube scooter's tube retained in like manner as in FIG. 21.

Referring back to FIG. 3, element 109 is a lower steering tube, and element 108 is an upright retention means, which when loosened, allows steering column 105 to tilt downwardly toward the knee pad 115 for compact storage in a vehicle.

Figure 23:
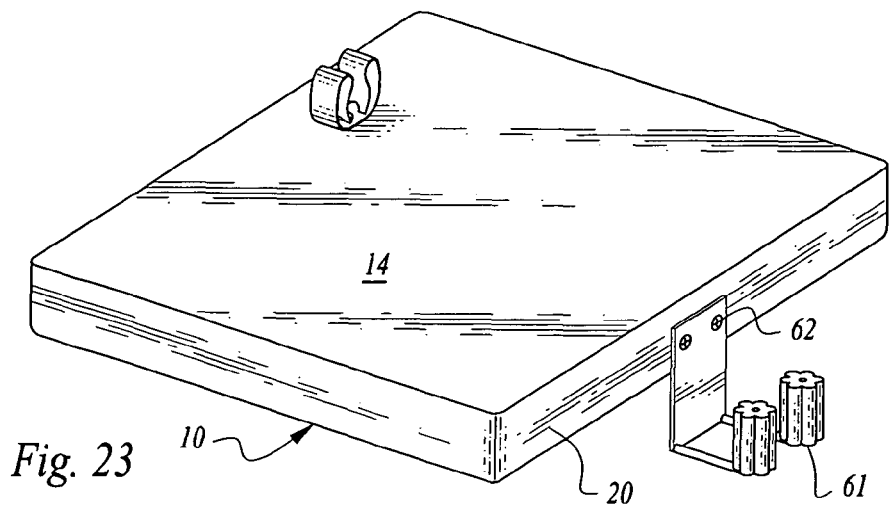
FIGS. 23 and 24 are perspective views each of which depict an alternative additional retaining means to prevent the device of this invention from moving from a horizontal plane after mounting on the tube(s) of a knee scooter.
Figure 24:
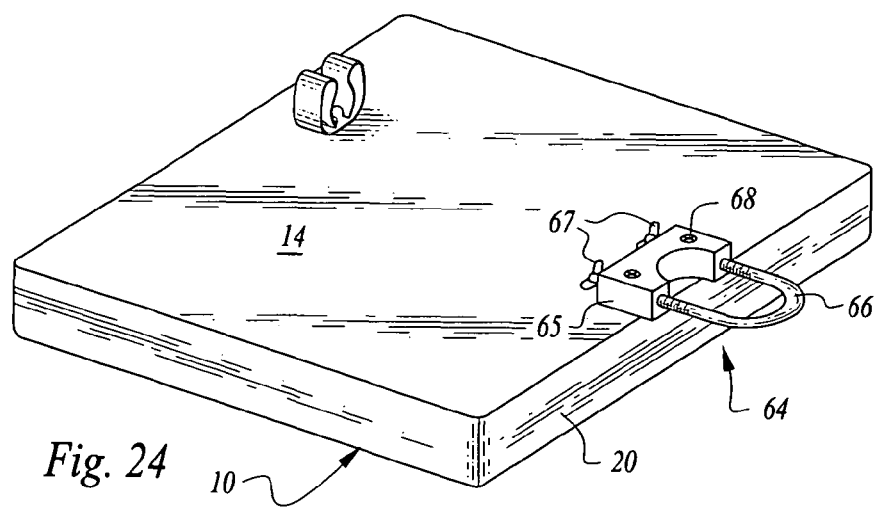

Turning now to FIGS. 23 and 24, two modes of preventing pivoting of the mounted device, particularly on single tube scooters are shown. In both of these FIGURES all but one of the grip clips have been omitted for ease of illustration as have two straps 22,24. In FIG. 23, a first anti-rotational means, namely a broom clip such as one sold under the Crawford brand by Leheigh Consumer Products LLC or any other conventional broom clip 61, can be attached as by screws 62, through suitable bores to the front wall 20 of device 10 to snap around lower steering tube, so as to still permit the tube to rotate as in some model scooters, while providing an anti-torque means to prevent pivoting of the removably mounted device.

FIG. 24 illustrates another anti-torque means, 64. This second anti-torque means employs a bored block of metal or plastic 65 which is mounted by screws 65 to the bottom of device 10 and which has a threaded U-bolt 66 passing through the bores unseen. This U-bolt may be loosely tightened around lower steering tube 109—per FIG. 3—by wing nuts 67 to provide an anti rotational force on device 10 to keep it in a true horizontal plane. Either of these anti-rotational means can be employed with either the clamping mode of attachment or the grip clip mode of attachment to both single and double tube knee scooters.

Figure 25:
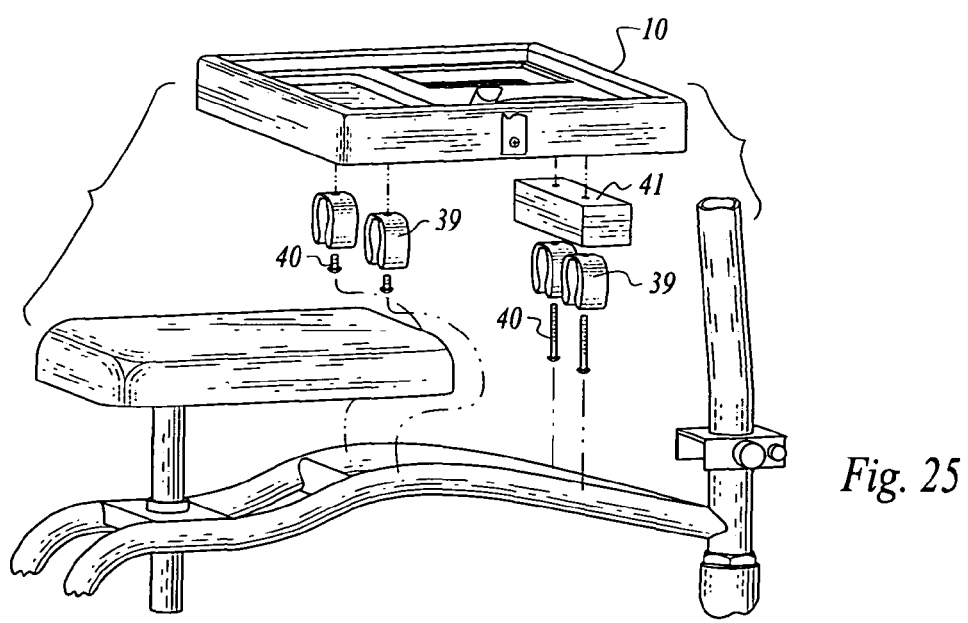
FIG. 25 is a perspective view of a minor modification of the first embodiment of this invention for mounting on the Drive Medical model 790D knee scooter of the prior art.

When applicant Jacobs had a fractured ankle he used the two tube scooter made by Essential Medical Supply as illustrated in the drawings of this application. Drive Medical of Port Washington N.Y. sells a prior art knees cooter, model 790 that has two arcuate tubes. See FIG. 25. Therefore to permit either embodiment of the platform of this invention to be employed with that scooter it is necessary to interpose a suitably sized sizing block, 41 between the underside of the device and the front set of grip clips. See FIG. 10. Sizing block 41 would be screwed or otherwise attached to the underside of the platform and the grip clips would be mounted thereon. It is within the skill of the art to determine the dimensions of the sizing block 41 for this or any other arcuate tube knee scooter.

It is seen that we have a devised a series of storage platforms that can be mounted both removably and semi-permanently upon knee scooters (knee walkers) made by various manufacturers. A variety of mount means have been set forth such that the devices of this invention will appeal to the users of a variety of the knee scooters that are available in the marketplace today.

While a specific brand of gripping clips has been set forth, it is to be understood that any similar arcuate shaped metal or plastic clip that can releasably grip metal tubing can be employed.

We claim:

1. An apparatus that mounts in a horizontal disposition on a knee scooter which has at least one horizontal frame member, and a cushion disposed above said at least one frame member, which apparatus is for the transportation of goods between locations, by a partially disabled person, which apparatus comprises:

a generally rectangular one piece main body member having a finite length, width, and height, and having a top surface and a bottom surface, a left side and a right side, and having recesses in the top surface thereof of various shapes for the lodging of articles in the recesses for the retention thereof during the operation of the knee scooter, and means on the bottom surface of said main body to mount the main body to the at least one horizontal frame member of a knee scooter, including a pair of straps, one on the left side and one on the right side for securing large items that may rest on the top surface thereof, wherein the straps are of a hook and loop material of opposite genders, and two tabs disposed on the front surface of the main body, said two tabs being of the opposite gender proximal of each of the straps to engage said straps when not in use.

2. The apparatus of claim 1 including a circumscribing upstanding raised rim around the periphery of the main body of the storage platform at a higher elevation than the top surface of said main body.

3. The apparatus of claim 1 wherein the recesses include square recesses and round recesses.

4. The apparatus of claim 1, wherein an elongated trough is disposed in the top surface at a diagonal to the front surface of the main body.

5. The apparatus of claim 1 wherein there is a rear trough adapted to hold a pen or tableware horizontally.

6. The apparatus of claim 1 wherein the means to removably mount the main body to the knee scooter frame comprises: at least two medium size grip clips.

7. An apparatus that mounts in a horizontal disposition on a knee scooter which has at least one horizontal frame member, and a cushion disposed above said at least one frame member, which apparatus is for the transportation of goods between locations, by a partially disabled person, which apparatus comprises:

a generally rectangular one piece main body member having a finite length, width, and height, and having a top surface and a bottom surface, a left side and a right side, and having at least one set of concentric circular recesses in the top surface thereof for the lodging of jars, cups and other articles, said individual recesses corresponding to the size of the base of an article to be disposed in one of the recesses for the retention thereof during the operation of the knee scooter, and having a circumscribing upstanding raised rim around the periphery of the main body of the storage platform, means on the bottom surface of said main body to mount the main body to the at least one horizontal frame member of a knee scooter further including a pair of straps, one on the left side and one on the right side of said main body for securing large items that may rest on the too surface thereof, wherein the straps are of a hook and loop material of opposite genders, and a pair of tabs is disposed on the front surface of the main body, one tab being of the opposite gender proximal of each of the straps to engage said straps when not in use.

8. The apparatus of claim 7 wherein the means to removably mount the main body to the knee scooter frame comprises: at least two medium size grip clips.

9. The apparatus of claim 8 wherein the mount means comprises two rows of grip clips each row having two resilient grip clips.

10. The apparatus of claim 7 further including at least one elongated trough in the top surface of said main body.

11. An apparatus that mounts in a horizontal disposition a knee scooter which has at least one horizontal frame member, and a cushion disposed above said at least one frame member, which apparatus is for the transportation of goods between locations, by a partially disabled person, which apparatus comprises:

a generally rectangular one piece main body member having a finite length, width, and height, and having a top surface and a bottom surface, a left side and a right side, and having recesses in the top surface thereof of various shapes for the lodging of articles, said individual recesses corresponding to the size of the base of an article to be disposed in one of the recesses for the retention thereof during the operation of the knee scooter, and including a circumscribing upstanding raised rim at a higher elevation from the top surface disposed around the periphery of the main body of the storage platform, wherein said recesses include concentric square recesses sized to retain different sized dairy cartons and concentric circular recesses to retain different sizes of jars or cups, means on the bottom surface of said main body to mount the main body to the horizontal frame member(s) of a knee scooter, said means being selected from the group consisting of grip clips and boltable pipe clamp members wherein the main body also includes at least one elongated trough sized in its smaller diameter to be slightly larger than the diameter of a writing pen further including a forward facing anti-torque means to retain the platform in a generally horizontal disposition when mounted on a knee scooter.

12. The apparatus of claim 11 wherein the anti-torque means is a broom clip mounted on the front of the platform for engagement to a tube of a knee scooter.

13. The apparatus of claim 11 wherein the anti-torque means is a threaded U-bolt mounted to the underside of the front of the platform for engagement to a tube of a knee scooter.

14. An apparatus that mounts in a horizontal disposition on the frame member(s) of a knee scooter for the transportation of goods between locations, by a partially disabled person, which apparatus comprises:

a generally rectangular one piece main body member having a finite length, width, and height having recesses in the top surface thereof of various shapes for the lodging of articles in the recesses for the retention thereof during the operation of the knee scooter, and a circumscribing rim having a top surface of greater elevation than the top surface of the main body top surface, and means on the bottom side of said main body to mount the main body to horizontal tube(s) of a knee scooter a pair of straps, one on the left side and one on the right side for securing large items that may rest on the top surface thereof, which straps are matingly engageable hook and loop members of opposite genders, wherein said recesses include at least a pair of concentric circular recesses disposed in the top surface of the main body and wherein an elongated recess is disposed in the top surface at a diagonal to the front surface of the main body, and further wherein concentric square recesses are disposed in the top surface of the main body, and still further including both a pair of concentric square recesses disposed in the top surface of the main body and a front facing anti-torque means for horizontal stabilization when mounted on a knee scooter.

15. The apparatus of claim 14 wherein the concentric square recesses are about 4.25 and 3.25 inches respectively per side, for quart and ½ gallon sized cardboard milk/juice cartons and the circular recesses are about 3.5 inches and 3.0 inches in diameter respectively, and further including a large recess sized for holding at least a smartphone
the means for mounting being at least one row of grip clips disposed on the bottom surface of said main body.

* * * * *